G. F. J. COLBURN, OF NEWARK, NEW JERSEY, ASSIGNOR TO JOHN DAVIDSON, OF SAME PLACE.

Letters Patent No. 85,166, dated December 22, 1868.

IMPROVED DENTIFRICE-PASTE.

The Schedule referred to in these Letters Patent and making part of the same.

*To all whom it may concern:*

Be it known that I, G. F. J. COLBURN, of the city of Newark, and State of New Jersey, have invented a new and useful Dentifrice-Paste; and I do hereby declare that the following is a full and exact description thereof.

The nature of my invention consists in compounding certain chemicals, whose properties are such as to remove secretions from the teeth, in the form of a paste, for the better convenience of their use, as the following statement sets forth.

I mix together six pounds of washed pulverized chalk, a quarter of a pound of orris-root, (pulverized,) one ounce of pulverized Castile soap, one ounce of oil of winter-green, and three pounds of glycerine.

A compound of these proportions, when well mixed, produces a pasty mass, which readily exudes, under pressure, from a proper holder.

I do not confine myself to these proportions, as they may be varied considerably, without detriment to their use.

When, heretofore, dentifrices, in the form of a paste, have been attempted, they have failed to maintain their plastic condition, and become hard and worthless, the liquid element evaporating; but in the use of glycerine, as set forth, in this compound, a permanent moist and plastic condition is maintained.

I therefore claim as my invention, and desire to secure Letters Patent—

For the mixing of the solids herein described, or their chemical equivalents, with glycerine, all substantially in the manner and for the purpose hereinbefore described.

G. F. J. COLBURN.

Witnesses:
SAM. W. BOND,
JOHN DAVIDSON.